United States Patent
Kim et al.

(10) Patent No.: US 7,913,582 B2
(45) Date of Patent: Mar. 29, 2011

(54) TRANSMISSION FOR TRACTOR

(75) Inventors: Hyo-jung Kim, Gyeonggi-do (KR); Sang-heon Lee, Gyeonggi-do (KR)

(73) Assignee: LS Mtron Ltd., Gyeonggi-Do (KR)

( * ) Notice: Subject to any disclaimer, the term of this patent is extended or adjusted under 35 U.S.C. 154(b) by 477 days.

(21) Appl. No.: 12/078,238

(22) Filed: Mar. 28, 2008

(65) Prior Publication Data

US 2008/0287257 A1    Nov. 20, 2008

(30) Foreign Application Priority Data

May 17, 2007    (KR) .................. 10-2007-0048062

(51) Int. Cl.
*F16H 3/093*    (2006.01)
(52) U.S. Cl. .......................................... 74/360; 74/331
(58) Field of Classification Search ............. 74/331, 74/333, 340, 360
See application file for complete search history.

(56) References Cited

U.S. PATENT DOCUMENTS

| | | | | |
|---|---|---|---|---|
| 4,960,005 A | * | 10/1990 | Kashiwase | 74/329 |
| 6,634,247 B2 | * | 10/2003 | Pels et al. | 74/329 |
| 7,166,059 B2 | * | 1/2007 | Reitz et al. | 477/5 |
| 7,625,311 B2 | * | 12/2009 | Dilzer | 477/5 |

FOREIGN PATENT DOCUMENTS

| | | |
|---|---|---|
| JP | 07-137553 | 5/1995 |
| JP | 07-139618 | 5/1995 |
| KR | 10-2001-0014550 | 2/2001 |

* cited by examiner

*Primary Examiner* — Ha D. Ho
(74) *Attorney, Agent, or Firm* — McDermott Will & Emery LLP

(57) ABSTRACT

A transmission for a tractor has a main transmission part between a forward/reverse transmission part and a sub transmission part. The main transmission part has a driving shaft, a first sub shaft parallel with the driving shaft, a second sub shaft parallel with the first sub shaft, an output shaft arranged between the first sub shaft and the second sub shaft, first and second driving gears installed spaced to a distance from each other, third and fourth driving gears installed spaced to a distance from each other, a first output gear installed on the output shaft, a second output gear installed on the output shaft, a first clutch arranged between the first driving gear and the second driving gear, and a second clutch arranged between the third driving gear and the fourth driving gear.

5 Claims, 8 Drawing Sheets

FIG. 8 ns gears, and the main driving gear of the driving shaft is engaged with the driven gears of the first and second sub shafts to thereby turn these sub shafts, and furthermore the main transmission part is formed to have the power transmitted to the sub transmission part from the output shaft disposed between the first and second sub shafts, thereby making the length of the main transmission part short to reduce the length of the transmission in whole.

TRANSMISSION FOR TRACTOR

CROSS-REFERENCE TO RELATED APPLICATION

This application claims all benefits of Korean Patent Application No. 10-2007-0048062 filed on May 17, 2007 in the Korean Intellectual Property Office, the disclosures of which are incorporated herein by reference.

BACKGROUND OF THE INVENTION

1. Field of the invention

The present invention relates to a transmission for a tractor, and more particularly to a transmission for a tractor in which a main transmission part arranged between a forward/reverse transmission part and a sub transmission part is shortened, thereby reducing the whole length thereof.

2. Description of the Prior Art

Generally, a transmission for a tractor is formed in type of a series of transmission parts that are connected in order from an engine. That is, the transmission generally includes a forward/reverse transmission part that changes a direction of rotating power of the engine to a forward/reverse direction, a main transmission part that changes speed in four-stage at an output side of the forward/reverse transmission part, and a sub transmission part that changes speed in two to four-stage at an output side of the main transmission part. The transmission includes a power take-off (PTO) transmission part that draws power for driving an attachment installed on a rear side of the tractor.

In connection with such a transmission, Korean Patent Registration No. 0373595 (Feb. 12, 2003), and Japanese Patent Nos. 3266720 (Jan. 11, 2002) and 3422430 (Apr. 25, 2003) have disclosed a power shift type transmission in which the transmission device of the main transmission part is automated using a hydraulic clutch instead of a conventional synchromesh unit.

In such a transmission, although the power shift type is introduced to the main transmission for convenience of transmission, a series of all 4 gears are arranged longitudinally in a single row, i.e., in forward and reverse directions, so that a problem is caused in that length increment due to introduction of the power shift causes the main transmission part and therefore the whole transmission to increase in length thereof. In this way, as the length of the transmission is lengthened, a distance between a front wheel and a rear wheel becomes far away to problematically increase a minimum turning radius as well as to hardly secure installation space for a device for other additional function. For example, if the sub transmission part is intended to include a first sub transmission part changeable in speed in two-stage and further a second sub transmission part (e.g., ultra low speed transmission part) changeable in speed from the first sub transmission part, it is impossible for the above conventional transmission to secure the additional installation space for the second sub transmission part.

SUMMARY OF THE INVENTION

Accordingly, the present invention has been made to solve the above-mentioned problems occurring in the prior art, and an object of the present invention is to provide a transmission for a tractor in which a length of a main transmission part is made short to thereby reduce the length of the transmission in whole.

In accordance with an aspect of the present invention, there is provided a transmission for a tractor comprising a main transmission part between a forward/reverse transmission part and a sub transmission part, the main transmission part comprises:

a driving shaft including a main driving gear connected to an output side of the forward/reverse transmission part to transmit power to the main transmission part;

a first sub shaft parallel with the driving shaft and having a driven gear engaged with the main driving gear of the driving shaft to thereby rotate;

a second sub shaft parallel with the first sub shaft with the driving shaft disposed therebetween and having a driven gear engaged with the main driving gear of the is driving shaft to thereby rotate;

an output shaft arranged between the first sub shaft and the second sub shaft parallel with them to thereby transmit power from the first sub shaft and the second sub shaft to the sub transmission part;

first and second driving gears rotatably installed spaced to a distance from each other on the first sub shaft and having different teeth in number from each other;

third and fourth driving gears rotatably installed spaced to a distance from each other on the second sub shaft and having different teeth in number from each other;

a first output gear installed on the output shaft to rotate together with the same while being continuously engaged with the first driving gear of the first sub shaft and the third driving gear of the second sub shaft;

a second output gear installed on the output shaft to rotate together with the same while being continuously engaged with the second driving gear of the first sub shaft and the fourth driving gear of the second sub shaft;

a first clutch arranged between the first driving gear and the second driving gear of the first sub shaft to selectively operate in a state of being connected to the first driving gear, a neutral state, or a state of being connected to the second driving gear; and a second clutch arranged between the third driving gear and the fourth driving gear of the second sub shaft to selectively operate in a state of being connected to the third driving gear, a neutral state, or a state of being connected to the fourth driving gear.

The clutches comprise a hydraulic multiple disk clutch.

The main transmission part further comprises a driven shaft parallel with the output shaft and serving as an input shaft of the sub transmission part, wherein a driven gear is installed on the driven shaft so as to be engaged with any one of first output gear and the second output gear so that the power from the output shaft is transmitted to the sub transmission part via the driven shaft.

An additional transmission gear device is further installed on the driven shaft for additional transmission of power output from the driven shaft to the sub transmission part.

The additional transmission gear device comprises a further idle shaft installed parallel with the driven shaft, a reduction gear train installed on the driven shaft and the idle shaft, and a clutch carrying out selective connection in a state of transmitting the power from the driven shaft to the sub transmission part as it is, a neutral state, or a state of transmitting the power from the reduction gear train to the sub transmission part.

According to the present invention, the output shaft is arranged between the first sub shaft and the second sub shaft parallel with them, each sub shaft having two transmisratios different from each other, so that the lengths of the main transmission part and therefore the whole transmission can be made short.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, the construction and the effects of the present invention will be described in detail with reference to the accompanying drawings.

Figure 1:
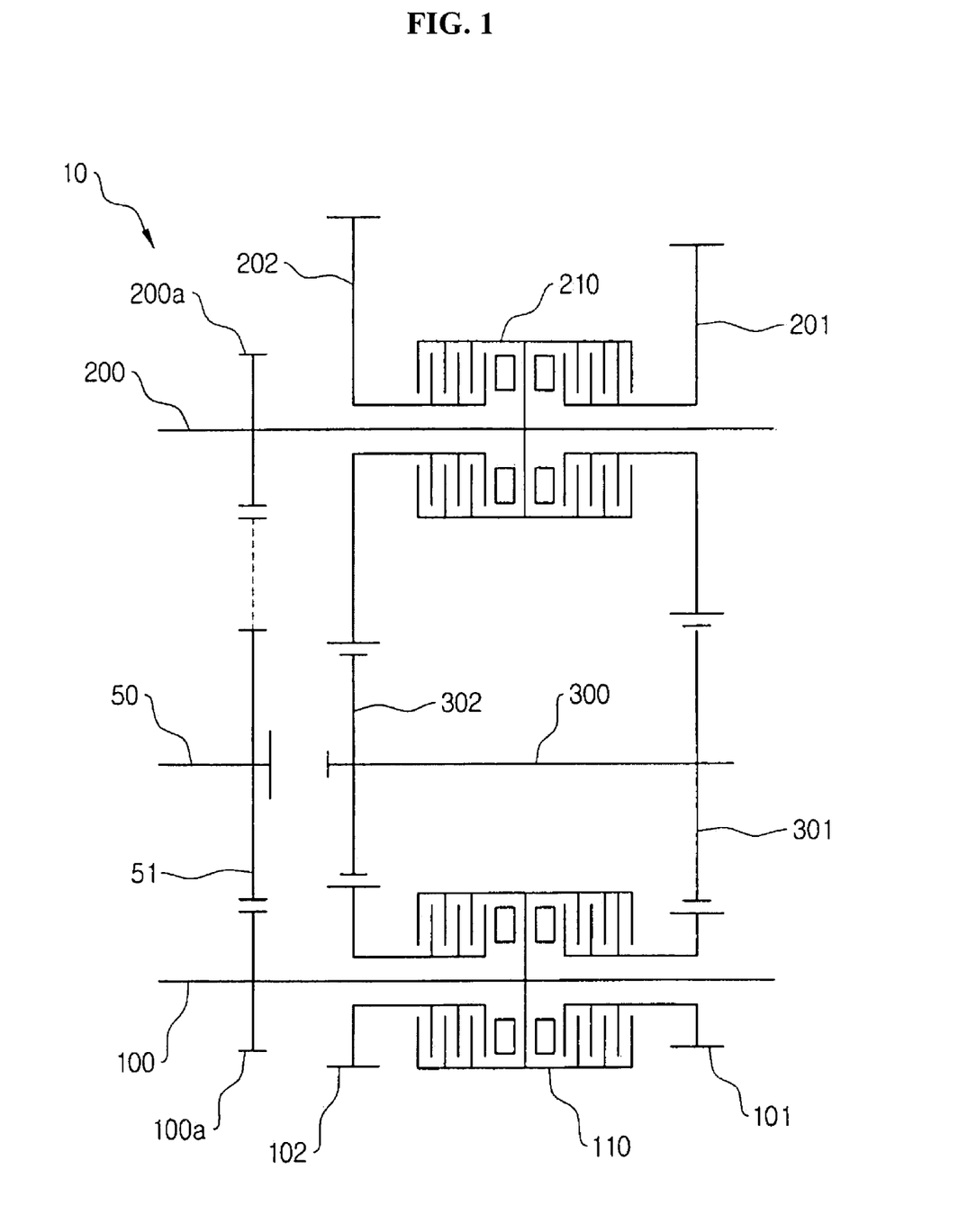
FIG. 1 is a schematic systematic diagram of a transmission for a tractor according to an embodiment of the present invention.

As illustrated in FIG. 1, a transmission for a tractor comprising a main transmission part between a forward/reverse transmission part and a sub transmission part is provided. The main transmission part comprises: a driving shaft 50 including a main driving gear 51 connected to an output side of the forward/reverse transmission part to transmit power to the main transmission part 10; a first sub shaft 100 parallel with the driving shaft 50 and having a driven gear 100a engaged with the main driving gear 51 of the driving shaft 50 to thereby rotate; a second sub shaft 200 parallel with the first sub shaft 100 with the driving shaft 50 disposed therebetween and having a driven gear 200a engaged with the main driving gear 51 of the driving shaft 50 to thereby rotate; an output shaft 300 arranged between the first sub shaft 100 and the second sub shaft 200 parallel with them to thereby transmit power from the first sub shaft 100 and the second sub shaft 200 to the sub transmission part; first and second driving gears 101, 102 rotatably installed spaced to a distance from each other on the first sub shaft 100 and having different teeth in number from each other; third and fourth driving gears 201, 202 rotatably installed spaced to a distance from each other on the second sub shaft 200 and having different teeth in number from each other; a first output gear 301 installed on the output shaft 300 to rotate together with the same while being continuously engaged with the first driving gear 101 of the first sub shaft 100 and the third driving gear 201 of the second sub shaft 200; a second output gear 302 installed on the output shaft 300 to rotate together with the same while being continuously engaged with the second driving gear 102 of the first sub shaft 100 and the fourth driving gear 202 of the second sub shaft 200; a first clutch 110 arranged between the first driving gear 101 and the second driving gear 102 of the first sub shaft 100 to selectively operate in a state of being connected to the first driving gear 101, a neutral state, or a state of being connected to the second driving gear 102; and a second clutch 210 arranged between the third driving gear 201 and the fourth driving gear 202 of the second sub shaft 200 to selectively operate in a state of being connected to the third driving gear 201, a neutral state, or a state of being connected to the fourth driving gear 202.

According to the present invention, if any one of driving gears 101, 102, 201, and 202, each having different transmission ratios, is selected by a clutch 110, 210, power from a driving shaft 50 is transmitted to any one of output gears 301 and 302 via the selected driving gear, and is inputted to a sub transmission part via an output shaft 300 with output gears 301 and 302 integrally engaged with each other.

According to the present invention, a first sub shaft 100 and a second sub shaft 200, each having two different transmission ratios, are installed parallel with each other, and an output shaft 300 rotating idle is arranged parallel between the first and second sub shafts 100 and 200, so that the length of a main transmission part 10 can be made short. That is, the first and second sub shafts 100 and 200 are arranged parallel with each other such that the first and second driving gears 101 and 102 for first and second-stage transmissions are arranged on the first sub shaft 100, and the third and fourth driving gears 201 and 202 for third and fourth-stage transmissions are arranged on the second sub shaft 200, so that the gear train from the first to fourth-stage is disposed overlapped without being longitudinally arranged in a row, thereby shortening the main transmission part 10. Further, in order to install the first/second-stage transmission parts and the third/fourth-stage transmission parts parallel with each other, the clutches 110 and 210 may be respectively installed on the first/second-stage transmission parts and the third/fourth-stage transmission parts, and the output shaft 300 of an idle shaft may be installed between the two sub shafts 100 and 200.

The clutches 110 and 210 preferably comprise a hydraulic multiple disk clutch. In such a construction, the clutches can be driven with hydraulic force, so that the manipulation of the transmission becomes convenient as compared to the case where a device such as a synchronizer and a link-associated clutch are used, and a transmission lever is forced to operate manually, and that the structure of the transmission is simplified due to removal of a complicated link mechanism. Herein, when the clutches 110 and 210 are used in a power shift type hydraulic clutch, the length thereof is increased a little as compared to the case of using a synchronizer, but the length increment is merely slight relative to the length decrement obtained by arranging the first/second-stage transmission parts and the third/fourth-stage transmission parts parallel with each other, so that the shortening effect of the whole length of the main transmission part is not greatly reduced.

According to the structure in which the output shaft 300 of the idle shaft is installed between the two sub shafts 100 and 200, it is possible to install a device such as an ultra low speed transmission part without length increment or even with minimum increment of the transmission. If the ultra slow speed transmission part is not installed, the output shaft 300 may come to an input shaft of the sub transmission part as it is, or otherwise, a driven gear is installed on the input shaft of the sub transmission part such that it may be engaged with any one of the first and second output gears 301 and 302 of the output shaft 300. In the latter case, the driven gear of the sub transmission part is made engaged with the second output gear 302 in front of the first output gear 301 so that the output power is drawn from the front side of the main transmission part without length increase of the transmission.

Figure 2:
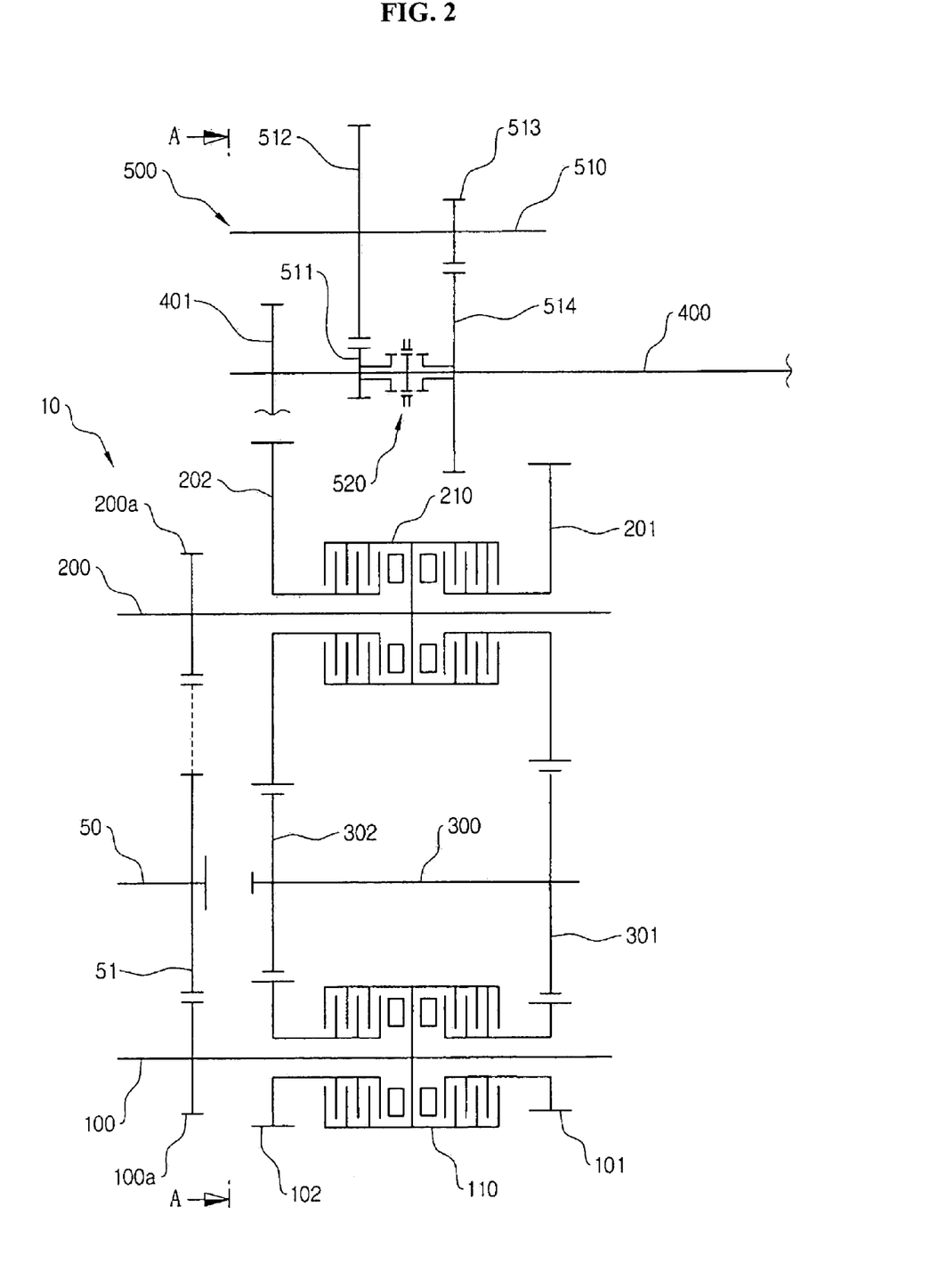
FIG. 2 is a schematic systematic diagram of a transmission for a tractor according to another embodiment of the present invention.

That is, as illustrated in FIG. 2, it may be configured such that a driven shaft 400 is further installed which is parallel with the output shaft 300 and serves as the input shaft of the sub transmission part, wherein a driven gear 401 is installed on the driven shaft 400 so as to be engaged with any one of first output gear 301 and the second output gear 302 of the output shaft 300 so that the power from the output shaft 300 is transmitted to the sub transmission part via the driven shaft 400.

With such a construction, an additional transmission gear device 500 is easily installed on the driven shaft 400 for additional transmission of power output from the driven shaft 400 to the sub transmission part without length increase of the transmission.

In the embodiment of FIG. 2, the additional transmission gear device 500 illustrates the construction comprising a further idle shaft 510 installed parallel with the driven shaft 400, a reduction gear train 511, 512, 513, and 514 installed on the driven shaft 400 and the idle shaft 510, and a clutch 520 carrying out selective connection in a state of transmitting the power from the driven shaft 400 to the sub transmission part as it is, a neutral state, or a state of transmitting the power from the reduction gear train 511, 512, 513, and 514 to the sub transmission part. In such an additional transmission gear device 500 illustrating an example of so called 'an ultra slow speed transmission part', the power transmitted from the output shaft 300 to the driven gear 401 is input to the sub transmission part via the driven shaft 400 as it is, or the power transmitted from the output shaft 300 to the driven gear 401 is reduced and transmitted to the driven shaft 400 via the reduction gear train 511, 512, 513, and 514 in series, and is input to the sub transmission part. Herein, the clutch 520 is illustrated in type of employing a known synchronizer device.

Figure 3:
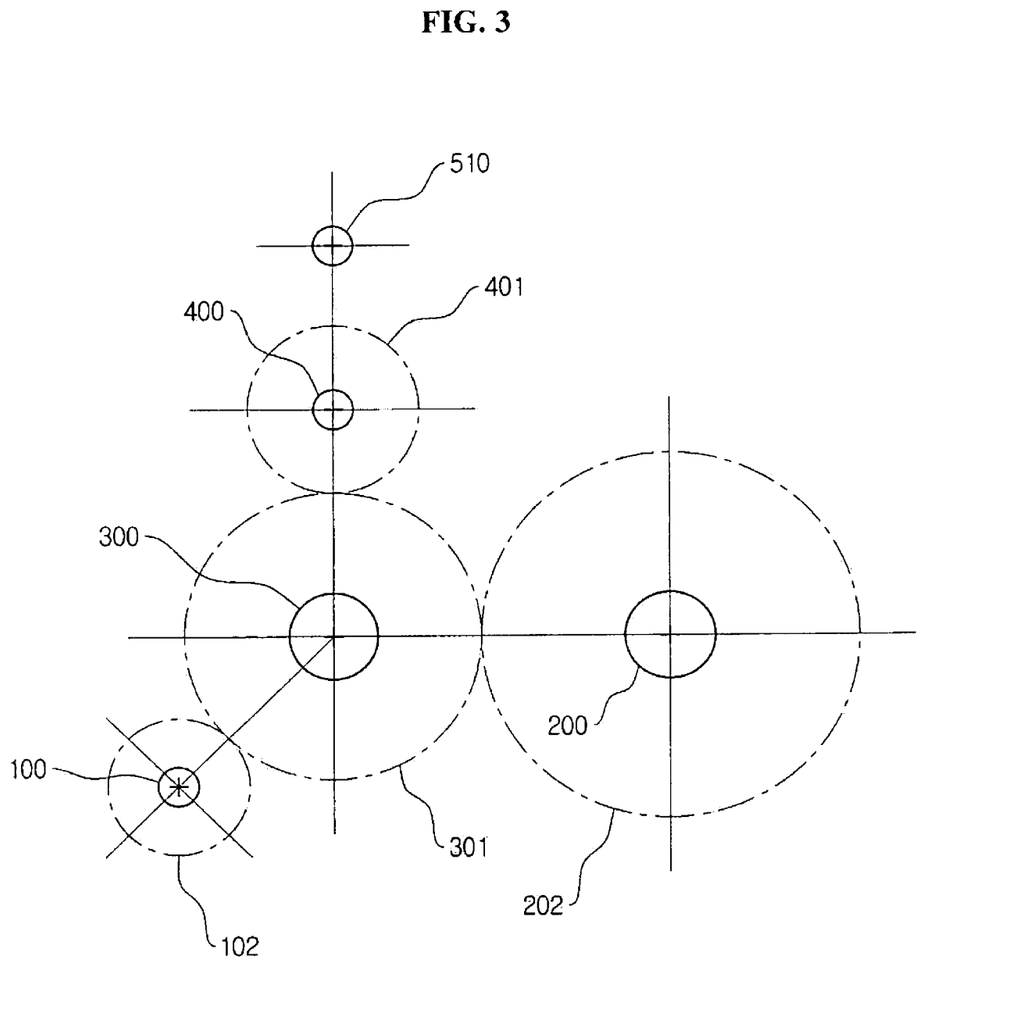
FIG. 3 is a sectional view of a shaft arrangement as viewed from a direction of A-A of FIG. 2.

FIG. 3 illustrates an example of the arrangement of the above-mentioned shafts 100, 200, 300, 400, and 500 taken along line A-A of FIG. 2. As illustrated, the shafts 100, 200, 300, 400, and 500 is preferably provided such that the first and second sub shafts 100 and 200 and the driven shaft 400 are radially arranged about the output shaft 300 in such a way as to extent as horizontally as possible so as not to increase in height.

Figure 4:
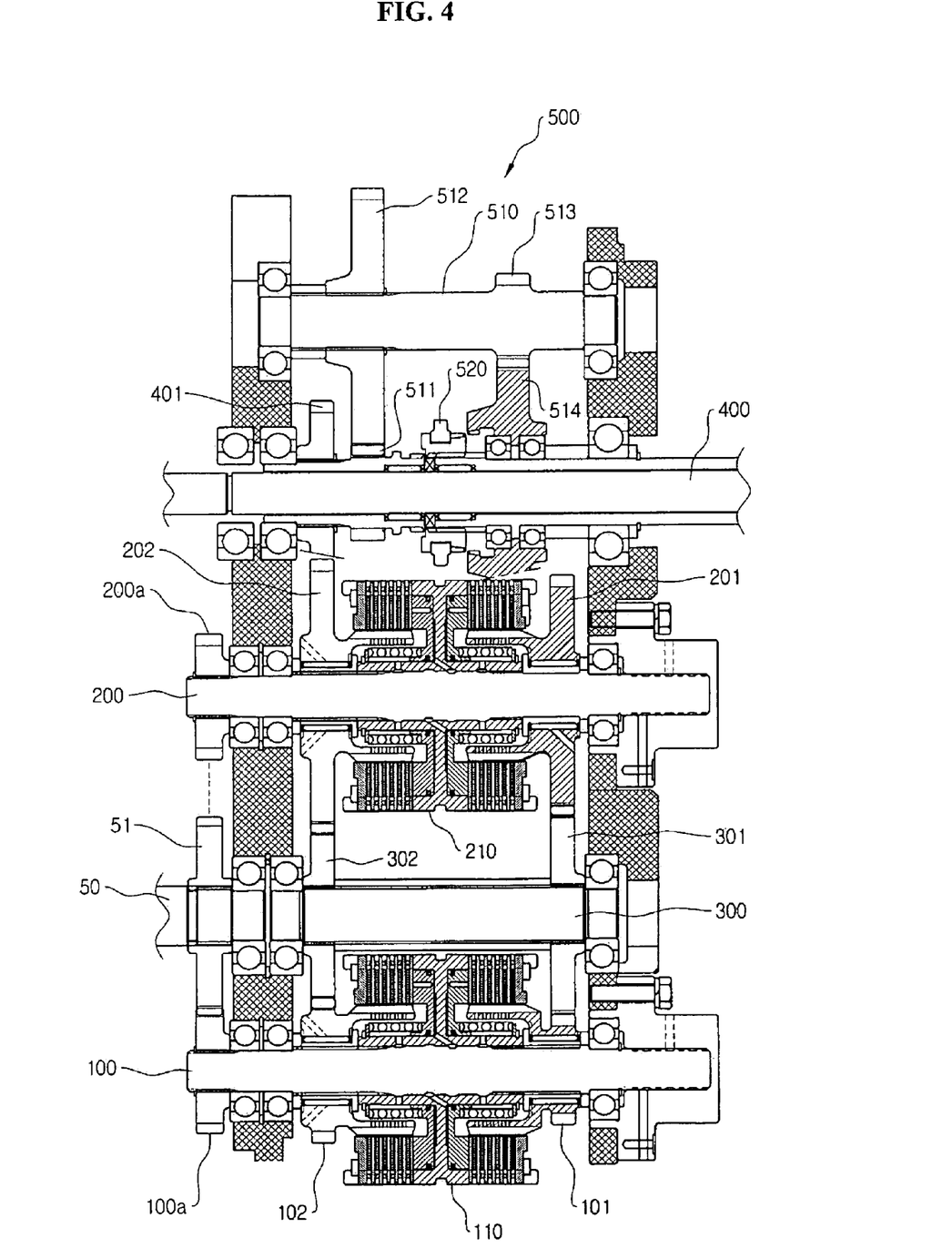
FIG. 4 is a schematic side sectional view of a transmission for a tractor according to the present invention.

FIG. 4 illustrates the sectional view of an actual structure in which the main transmission part 10 and the additional transmission gear device illustrated in FIGS. 1 to 3 are installed. As illustrated, the main transmission part 10 includes the driving shaft 50 and the main driving gear 51, the first sub shaft 100 and the driven gear 100a, the second sub shaft 200 and the driven gear 200a, the output shaft 300, the first and second driving gears 101 and 102 of the first sub shaft 100, the third and fourth driving gears 201 and 202 of the second sub shaft 200, the first and second output gears 301 and 302 of the output shaft 300, the first clutch 110 of the first sub shaft 100, and the second clutch 210 of the second sub shaft 200.

Further, the driven shaft 400, the driven gear 401, the idle shaft 510, the reduction gear train 511, 512, 513, and 514, and the clutch 520 are provided for the additional transmission gear device 500.

A transmission procedure will now be described in order with reference to FIGS. 5 to 8.

Figure 5:
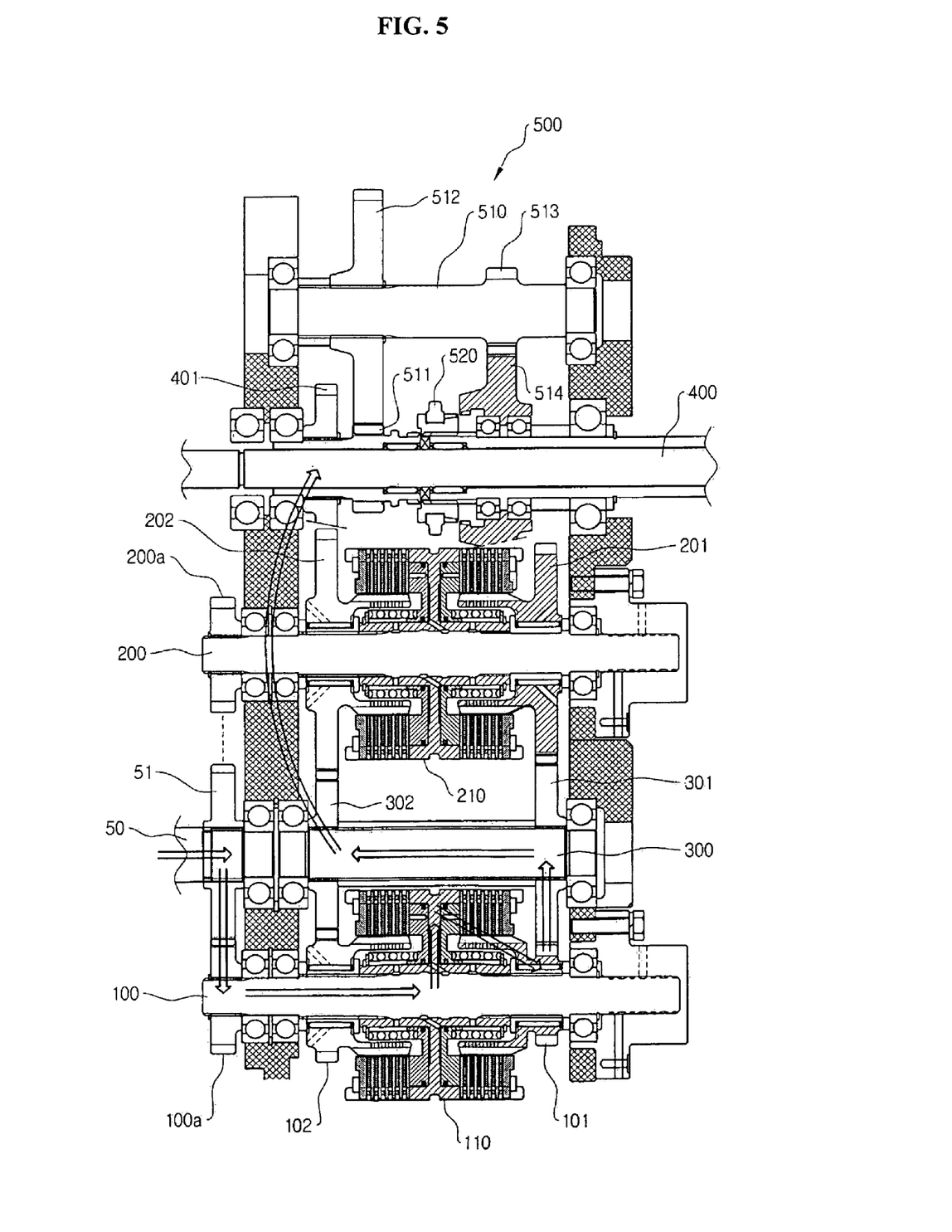
FIGS. 5 to 8 are schematic side sectional views each illustrating the power flow of respective first-stage to fourth-stage transmission in the transmission according to the present invention.

Before describing the transmission procedure of the main transmission part, that of the additional transmission gear device 500 that is the ultra slow speed transmission part will be first described in brief. In FIG. 5, the power by 1,2,3,4-stage (or level) transmission of the main transmission part 10 is transmitted to the output shaft 300 to rotate the same. The second output gear 302 of the output shaft 300 is engaged with the driven gear 401, which is integrally coupled to a gear 511, and is rotatably installed on the driven shaft 400 through the gear 511.

Herein, if the clutch 520 is connected to the side of the driven gear 401, i.e., the reduction gear train 511, the driven gear 401 and the driven shaft 400 are connected to each other so that the power transmitted from the output shaft 300 is input to the sub transmission part via the driven gear 401, the reduction gear train 511, and the driven shaft 400. If the clutch 520 is not connected to any of the driven gear 401 and the reduction gear train 514, it comes to so called 'a neutral state' so that the rotating force cannot be transmitted to the driven shaft 400. Meanwhile, if the clutch 520 is connected to the side of the reduction gear train 514, the reduction gear train 514 and the driven shaft 400 are coupled to each other so that the power transmitted to the driven gear 401 is reduced and transmitted to the driven shaft 400 via the reduction gear train 511, 512, 513, and 514 in series, and then is input to the sub transmission part.

The first to fourth-stage transmission procedure will now be described in order with reference to FIGS. 5 to 8.

(First-Stage Transmission)

As illustrated in FIG. 5, when a driver selects first-stage transmission to allow the first clutch 110 to be engaged with the first driving gear 101, the first driving gear 101 is integrally connected to the first sub shaft 100 via the first clutch 110. Thus, the power output from the forward/reverse transmission part is transmitted to the output shaft 300 via the driving gear 51, the driven gear 100a, the first sub shaft 100, the first clutch 110, the first driving gear 101, and the first output gear 301, and the power transmitted to the output shaft 300 is transmitted to the driven gear 401 by the second output gear 302, and is input to the sub transmission part.

(Second-Stage Transmission)

Figure 6:
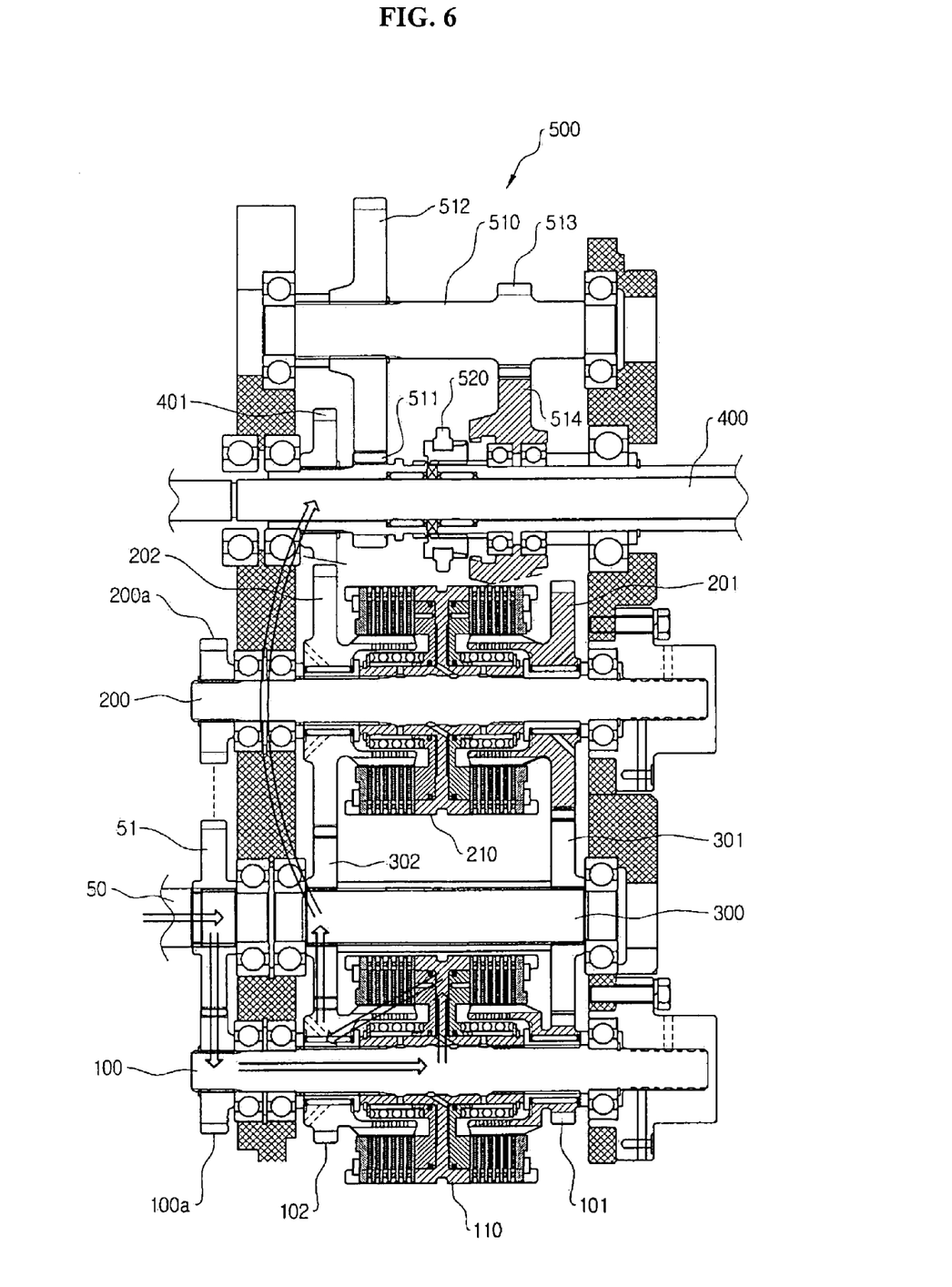

As illustrated in FIG. 6, when a driver selects second-stage transmission to allow the first clutch 110 to be engaged with the second driving gear 102, the second driving gear 102 is integrally connected to the first sub shaft 100 via the first clutch 110. Thus, the power output from the forward/reverse transmission part is transmitted to the second output gear 302 via the driving gear 51, the driven gear 100a, the first sub shaft 100, the first clutch 110, the second driving gear 102, and the power transmitted to the second output gear 302 is transmitted to the driven gear 401, and is input to the sub transmission part.

(Third-Stage Transmission)

Figure 7:
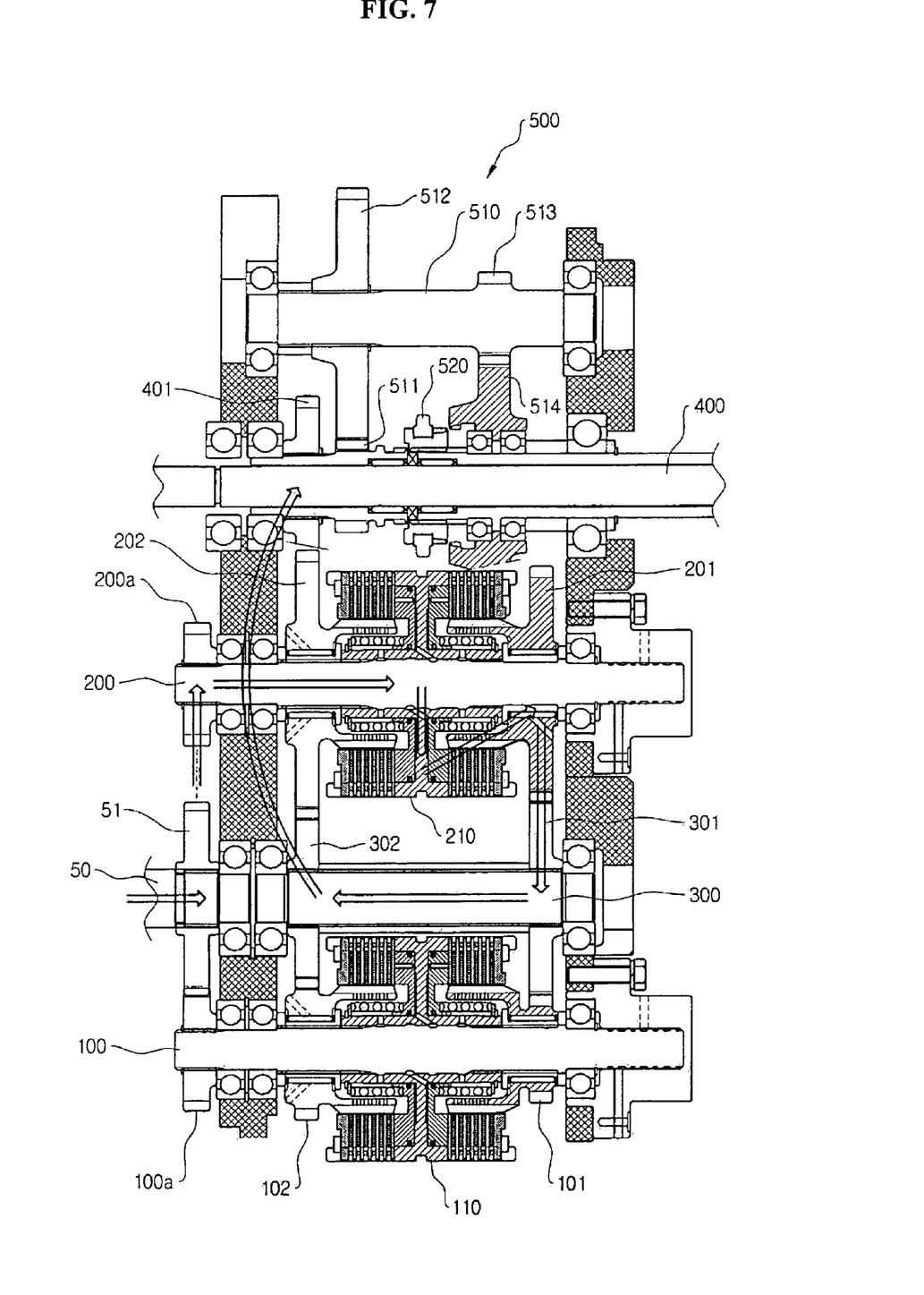

As illustrated in FIG. 7, when a driver selects third-stage transmission to allow the second clutch 210 to be engaged with the third driving gear 201, the third driving gear 201 is integrally connected to the second sub shaft 200 via the second clutch 210. Thus, the power output from the forward/reverse transmission part is transmitted to the output shaft 300 via the driving gear 51, the driven gear 200a, the second sub shaft 200, the second clutch 210, the third driving gear 201, and the first output gear 301, and the power transmitted to the output shaft 300 is transmitted to the driven gear 401 by the second output gear 302, and is input to the sub transmission part.

(Fourth-Stage Transmission)

Figure 8:
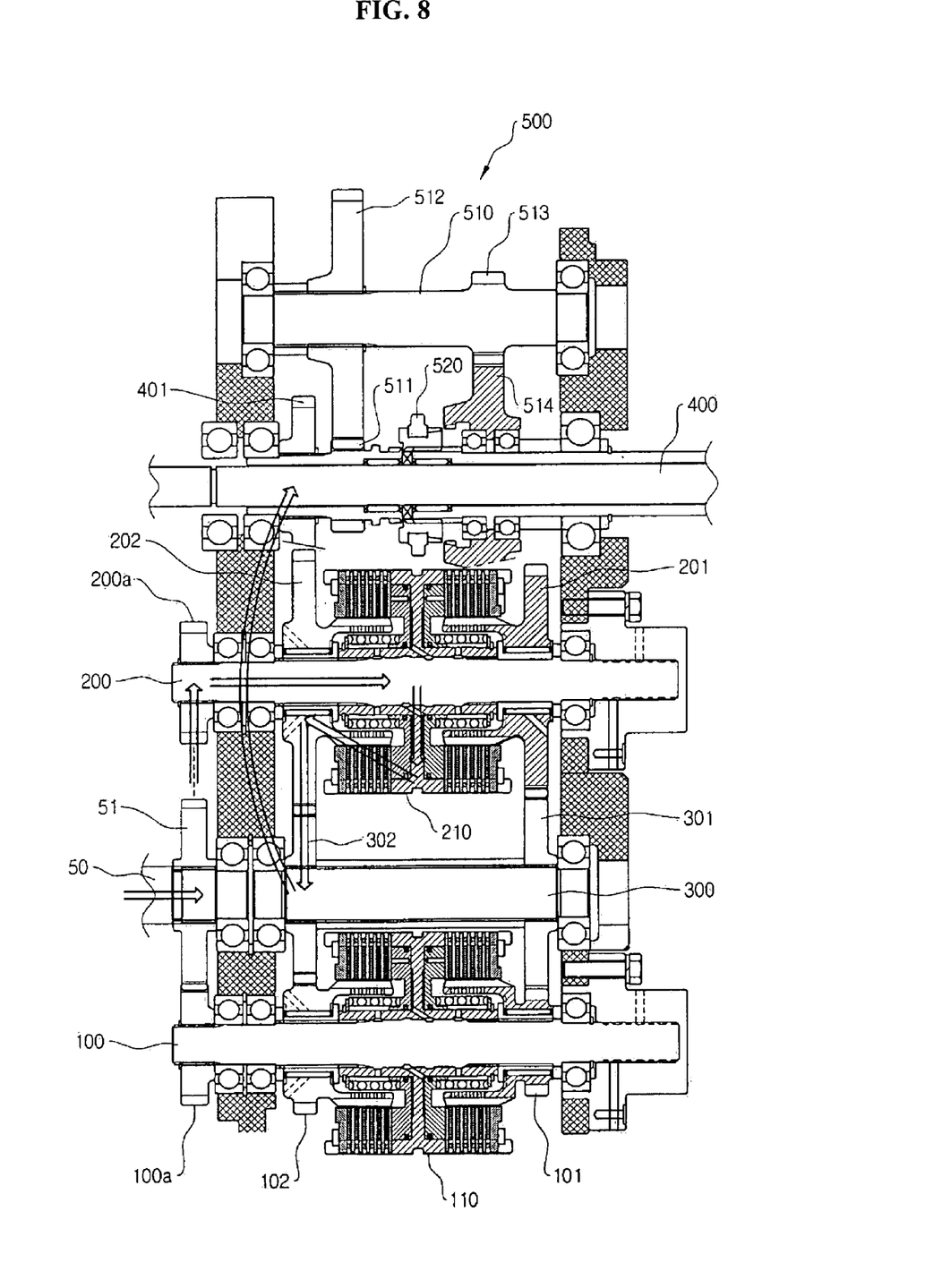

As illustrated in FIG. 8, when a driver selects fourth-stage transmission to allow the second clutch 210 to be engaged with the fourth driving gear 202, the fourth driving gear 202 is integrally connected to the second sub shaft 200 via the second clutch 210. Thus, the power output from the forward/reverse transmission part is transmitted to the second output gear 302 via the driving gear 51, the driven gear 200a, the second sub shaft 200, the second clutch 210, the fourth driving gear 202, and the power transmitted to the second output gear 302 is transmitted to the driven gear 401, and is input to the sub transmission part.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A transmission for a tractor comprising a main transmission part between a forward/reverse transmission part and a sub transmission part, the main transmission part comprises:
    a driving shaft including a main driving gear connected to an output side of the forward/reverse transmission part to transmit power to the main transmission part;
    a first sub shaft parallel with the driving shaft and having a driven gear engaged with the main driving gear of the driving shaft to thereby rotate;
    a second sub shaft parallel with the first sub shaft and the driving shaft disposed therebetween and having a driven gear engaged with the main driving gear of the driving shaft to thereby rotate;
    an output shaft arranged between the first sub shaft and the second sub shaft parallel with them to thereby transmit power from the first sub shaft and the second sub shaft to the sub transmission part;
    first and second driving gears rotatably installed spaced to a distance from each other on the first sub shaft and having different teeth in number from each other;
    third and fourth driving gears rotatably installed spaced to a distance from each other on the second sub shaft and having different teeth in number from each other;
    a first output gear installed on the output shaft to rotate together with the same while being continuously engaged with the first driving gear of the first sub shaft and the third driving gear of the second sub shaft;
    a second output gear installed on the output shaft to rotate together with the same while being continuously engaged with the second driving gear of the first sub shaft and the fourth driving gear of the second sub shaft;
    a first clutch arranged between the first driving gear and the second driving gear of the first sub shaft to selectively operate in a state of being connected to the first driving gear, a neutral state, or a state of being connected to the second driving gear; and
    a second clutch arranged between the third driving gear and the fourth driving gear of the second sub shaft to selectively operate in a state of being connected to the third driving gear, a neutral state, or a state of being connected to the fourth driving gear.

2. The transmission for a tractor according to claim 1, wherein the clutches comprise a hydraulic multiple disk clutch.

3. The transmission for a tractor according to claim 1, wherein the main transmission part further comprises a driven shaft parallel with the output shaft and serving as an input shaft of the sub transmission part, wherein a driven gear is installed on the driven shaft so as to be engaged with any one of first output gear and the second output gear so that the power from the output shaft is transmitted to the sub transmission part via the driven shaft.

4. The transmission for a tractor according to claim 3, wherein an additional transmission gear device is further installed on the driven shaft for additional transmission of power output from the driven shaft to the sub transmission part.

5. The transmission for a tractor according to claim 4, wherein the additional transmission gear device comprises a further idle shaft installed parallel with the driven shaft, a reduction gear train installed on the driven shaft and the idle shaft, and a clutch carrying out selective connection in a state of transmitting the power from the driven shaft to the sub transmission part as it is, a neutral state, or a state of transmitting the power from the reduction gear train to the sub transmission part.

* * * * *